(No Model.)  2 Sheets—Sheet 1.
W. S. REEDER.
SAW MILL DOG.
No. 377,911. Patented Feb. 14, 1888.
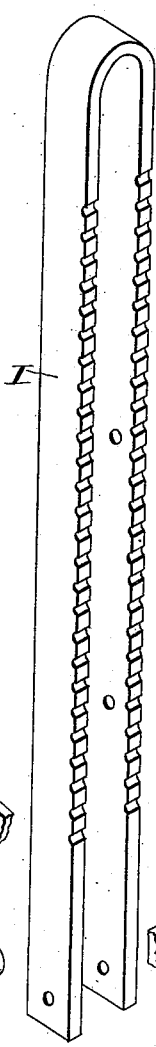
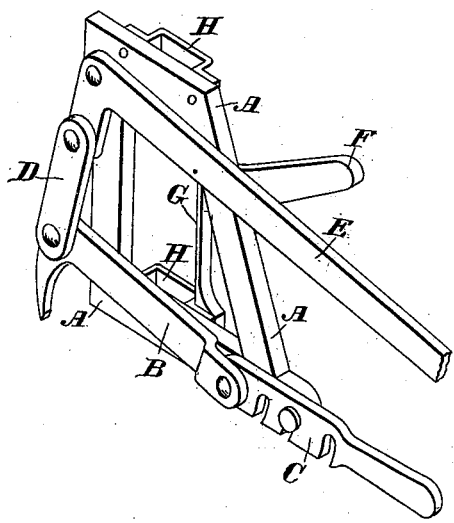
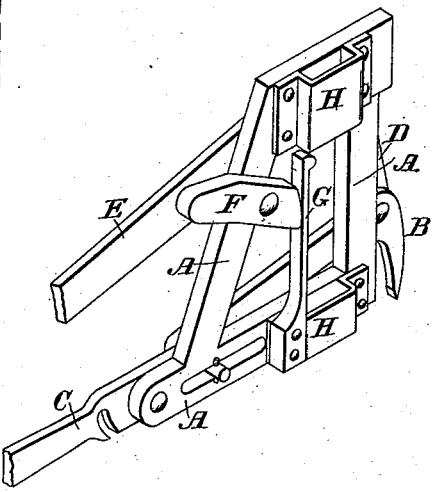
Attest:
L. D. Kingsland.
E. W. Douglas.
Inventor:
William S. Reeder
By Fowler & Fowler
Attys.

(No Model.) 2 Sheets—Sheet 2.
W. S. REEDER.
SAW MILL DOG.
No. 377,911. Patented Feb. 14, 1888.
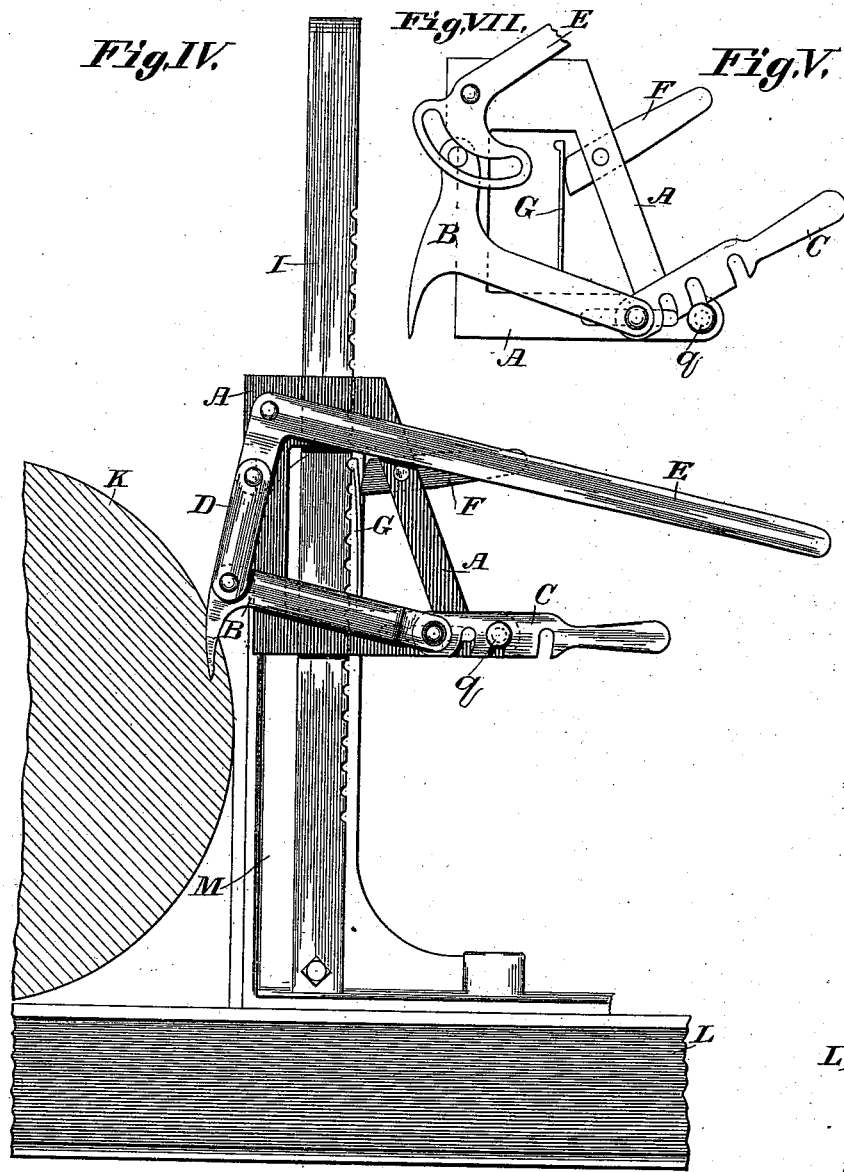
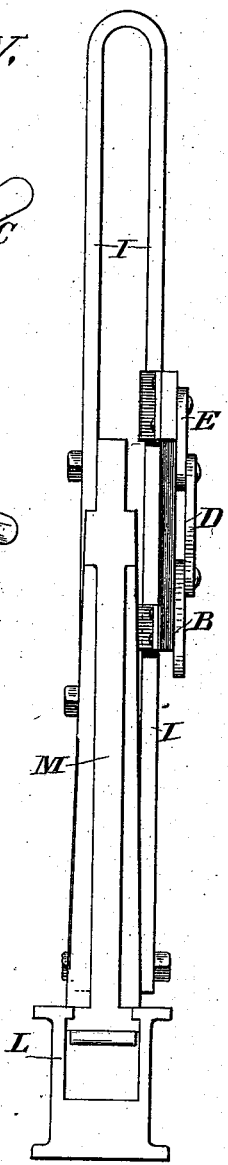
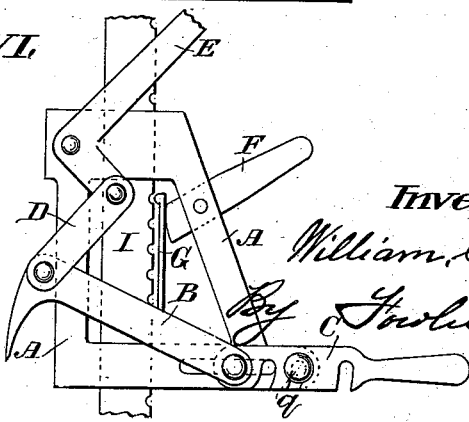
Attest:
L. F. Kingsland.
E. W. Douglas.
Inventor:
William S. Reeder,
By Fowler & Fowler
Attys

UNITED STATES PATENT OFFICE.

WILLIAM S. REEDER, OF ST. LOUIS, MISSOURI.

SAW-MILL DOG.

SPECIFICATION forming part of Letters Patent No. 377,911, dated February 14, 1888.

Application filed July 26, 1887. Serial No. 245,341. (No model.)

*To all whom it may concern:*

Be it known that I, WILLIAM S. REEDER, a citizen of the United States, residing in St. Louis, in the State of Missouri, have invented certain new and useful Improvements in Saw-Mill Dogs, of which the following is such a full, clear, and exact description as will enable any one skilled in the art to which it appertains to make and use the same, reference being had to the accompanying drawings, forming part of this specification.

The object of my invention is to construct a strong and cheap saw-mill dog—one that shall possess many desirable features and be good in every respect.

The invention consists in features of construction and arrangement, which will be hereinafter described, the novel features of which will be pointed out in the claims appended hereto.

In the accompanying drawings, Figure I is an isometric projection of a wrought-iron bar adapted to be secured to the knee or standard of the sliding part of a head-block, to which bar my saw-mill dog is adapted to be secured. Figs. II and III are isometric projections of a front and back view of my saw-mill dog detached. Fig. IV is an elevation of my saw-mill dog attached to the bar before referred to, which is secured to the knee or standard of the sliding part of the head-block, showing the dog engaging a log. Fig. V is an end elevation of the same; Fig. VI, a face view of the saw-mill dog and the wrought-iron bar to which it is adapted to be secured, and Fig. VII is a modification of my saw-mill dog.

The same letters of reference indicate the same or corresponding parts in the various figures of the drawings.

My dog is composed of a frame, A, to which the various parts are attached.

B is the dog, having a curved nose and pivoted to a notched handle, C, the notches of which engage a pin, *q*, projecting from the frame A. The pivot connecting the handle and dog protrudes through and within a slot in the frame A, as clearly shown in Figs. III, VI, and VII. To the dog B is pivotally secured a link, D, connected in the same manner to a lever, E, swiveled to the frame A. The frame A is also provided with loops or ears H H, in which the wrought-iron bar I is received. They permit the dog and frame to be slid up and down, so as to be adjusted to any height. The bar is notched, as shown in Figs. I and IV, and the lower ear, H, provided with a spring, G, whose end is adapted to engage the notches of the wrought-iron bar I, being forced and held in engagement therewith by means of a cam-lever, F. (See Figs. III, IV, VI, and VII.)

L is the sliding part of the head-block, to which the knee M or standard is secured, which knee has the wrought-iron bar I bolted to it.

In Fig. VII is shown a modification of the above-described saw-mill dog. In this modification the link D is dispensed with and the dog controlled by an eccentric slotted lever, E, which corresponds to the lever E before described. In the slot of this lever works a pin projecting from the dog B. The operation of the two devices is similar. The frame A of the dog should preferably be made of wrought malleable iron or steel.

K represents the log or other object which is to be sawed, and which is desired to be held in position during such operation.

The operation and manner of using my device is as follows: The dog being placed upon the wrought-iron bar I, which is then bolted to the knee or standard M, is raised or lowered and adjusted to the thickness of the log to be sawed. The cam-lever F is then pressed down, so as to force the end of the spring G into engagement with one of the notches and secure the frame and dog in position. For a log of large diameter the frame and the dog would have to be raised to a high position, and for one of less diameter, or the last planks, the frame and dog would be lowered a corresponding distance. Having secured the frame and dog in position on the wrought-iron bar, the notched handle C is manipulated, so as to change the position of the dog B, to get a greater hold for a log of great diameter and a lesser purchase for a log of less diameter. This latter adjustment being made, the handle E is manipulated, so as to force the nose of the dog B into the log, bringing the link D in line with the same. It will be observed in my dog that the force applied to drive the dog in the wood is in a direct line with the nose of said dog. This I regard as one of the especial features of my invention, which I believe to be novel in this class of devices. It will also be noted that the outer portion of the dog B is formed on a true radius from the center of the pivot connecting it with the notched handle C, and the inner portion thereof formed on a less radius, which has the effect of drawing the log or timber in closer proximity to the knee or standard while being forced in the timber, thus more securely holding it in position.

The operation of the modified form shown in Fig. VII will be obvious from the foregoing.

It will be manifest that the construction of my dog and its appurtenances may be varied in many ways without departing from the spirit of my invention, and that the details thereof may be varied and still be within my invention. I do not wish, therefore, to confine myself to exactly the mechanism shown; but What I desire to claim and secure by Letters Patent of the United States is—

1. The combination, in a saw-mill, with a standard thereof, of a dog, and an adjustable handle to which the same is pivoted, whereby the nose of the dog can be moved in or out to have a greater or less purchase upon a timber to be sawed.

2. The combination, as hereinbefore set forth, of a saw-mill dog, a frame-piece to which the same is pivoted, and an operating-lever also pivoted to said frame-piece independently of said pivoted dog, one of the ends of which lever is directly above the nose of said dog, whereby the force required to drive the dog into a timber is applied in a direct line with said nose, substantially as described.

3. The combination, in a saw-mill, with a standard thereof, of a dog, an adjustable handle to which the same is pivoted, whereby the nose of the dog can be moved in or out to have a greater or less purchase on a timber, and a pivoted lever operating the aforementioned dog and having one of its ends directly above the nose of said dog to apply the force in a direct line with said nose, for the purpose described.

4. The combination of a notched bar, as I, a frame, as A, carrying a dog, a spring, G, fixed to said frame and having a tooth and a lever, F, pivoted to the frame for holding the spring in engagement with the notches on said bar, substantially as and for the purpose described.

5. The combination, substantially as hereinbefore set forth, to form a saw-mill dog, of a frame-piece, a pivoted dog carried thereby, a notched handle to which the dog is pivotally secured also carried thereby, a pin or other device on said frame-piece adapted to be engaged by said notched handle, whereby the dog can be regulated to have a greater or less hold upon a timber, and means connected with said frame to force the dog into the timber to be sawed, substantially as and for the purpose described.

6. The combination, as hereinbefore set forth, to form a saw-mill dog, of a frame, A, a dog, B, pivoted to a notched handle, C, the pivot joining the same working in a slot in the frame, with a pin or other means upon the frame adapted to engage the notches in said handle, whereby the dog can be adjusted to have a greater or less hold upon the timber to be sawed, a lever, E, pivoted to said frame, and connecting mechanism between the latter and the dog B to force the same in a timber, substantially as described.

7. The combination, as hereinbefore set forth, of a frame-piece, as A, a dog, B, pivoted to a notched handle, C, the pivot of which plays in a slot in said frame, a lever, E, pivoted to said frame having intermediate mechanism between it and said dog to force the same in engagement with the timber to be sawed, ears H H upon said frame adapted to hold the same to an upright bar, a spring, as G, secured to the frame, and a lever, F, bearing thereupon to hold the same in engagement with the aforementioned bar, substantially as described.

In testimony whereof I have hereunto set my hand and seal this 19th day of July, 1887, in the presence of the two subscribing witnesses.

WILLIAM S. REEDER. [L. S.]

Witnesses:
   GEO. H. KNIGHT,
   JAS. E. KNIGHT.